UNITED STATES PATENT OFFICE.

GEORG UHL AND WILHELM SCHMIDT, OF NEW YORK, N. Y.

SILVER CLEANING AND POLISHING PASTE.

978,239.  Specification of Letters Patent.  Patented Dec. 13, 1910.

No Drawing.  Application filed May 17, 1910. Serial No. 561,904.

*To all whom it may concern:*

Be it known that we, GEORG UHL and WILHELM SCHMIDT, both subjects of the German Emperor, residing at New York, in the county of New York and State of New York, have invented certain new and useful Improvements in Silver Cleaning and Polishing Paste, of which the following is a specification.

The present invention relates to a composition of matter and particularly to a paste for cleaning silver or other metal and has for its object to provide a paste that will allow of a rapid cleaning and polishing of silver or other metal and whereby the drawback found with hitherto used pastes of this kind and which consists in that the paste etches or otherwise affects the metal, will be obviated. With this object in view, our composition or paste is composed of the following ingredients: soft soap, 0.50 pound, boiled whiting, 6.50 ounces, gray powder, (a mixture of prepared chalk, metallic mercury, clarified honey and water) 0.375 ounce, soda 0.25 ounce, and water 0.875 ounce. The soda is dissolved in warm water and all ingredients are thoroughly mingled by agitation.

In use, a sponge wetted in lukewarm water is dipped into the paste and the silver or other metal treated by rubbing in the ordinary way. After washing the silver appears highly polished. It has been found that this paste does not etch or otherwise affect the silver.

What we claim and desire to secure by Letters Patent is:

1. The herein described composition of matter, comprising soft soap, boiled whiting, a mixture of prepared chalk, metallic mercury, clarified honey and water, soda and water, substantially as and for the purpose set forth.

2. The herein described composition of matter for cleaning silver, comprising 0.5 pound soft soap, 6.5 ounces boiled whiting, 0.375 ounce of a mixture derived from 37% prepared chalk, 38% metallic mercury, 10% clarified honey and 15% water, 0.25 ounce soda and 0.875 ounce water, substantially as described.

In testimony whereof we affix our signatures in presence of two witnesses.

GEORG UHL.
WILHELM SCHMIDT.

Witnesses:
ELLIS V. LEVY,
MAX D. ORDMAN.